US009165312B2

(12) United States Patent
Longhenry et al.

(10) Patent No.: US 9,165,312 B2
(45) Date of Patent: Oct. 20, 2015

(54) MOBILE DEVICE ADVERTISING CHAINS

(71) Applicant: Tapjoy, Inc., San Francisco, CA (US)

(72) Inventors: Paul Longhenry, Hillsborough, CA (US); John Gronberg, San Francisco, CA (US); Jiangyi Pan, Fremont, CA (US); James Logsdon, Atlanta, GA (US)

(73) Assignee: TAPJOY, INC., San Francisco, CA (US)

( * ) Notice: Subject to any disclaimer, the term of this patent is extended or adjusted under 35 U.S.C. 154(b) by 165 days.

(21) Appl. No.: 13/920,294

(22) Filed: Jun. 18, 2013

(65) Prior Publication Data

US 2013/0346209 A1    Dec. 26, 2013

Related U.S. Application Data

(60) Provisional application No. 61/664,321, filed on Jun. 26, 2012.

(51) Int. Cl.
*G06Q 30/00* (2012.01)
*G06Q 30/02* (2012.01)
*H04W 4/06* (2009.01)

(52) U.S. Cl.
CPC ........ *G06Q 30/0267* (2013.01); *G06Q 30/0217* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 7,848,940 | B1 * | 12/2010 | Harniman et al. | 705/5 |
| 8,544,039 | B2 * | 9/2013 | Chang et al. | 725/35 |
| 8,682,716 | B2 * | 3/2014 | Redford et al. | 705/14.22 |
| 2003/0055727 | A1 * | 3/2003 | Walker et al. | 705/14 |
| 2004/0193484 | A1 * | 9/2004 | Allen | 705/14 |
| 2004/0267611 | A1 * | 12/2004 | Hoerenz | 705/14 |
| 2006/0184426 | A1 * | 8/2006 | Ohashi | 705/26 |
| 2007/0266130 | A1 * | 11/2007 | Mazur et al. | 709/223 |
| 2008/0109300 | A1 * | 5/2008 | Bason | 705/14 |
| 2008/0276269 | A1 * | 11/2008 | Miller et al. | 725/34 |
| 2009/0048926 | A1 * | 2/2009 | Salesky et al. | 705/14 |
| 2009/0055267 | A1 * | 2/2009 | Roker | 705/14 |
| 2009/0070210 | A1 * | 3/2009 | White et al. | 705/14 |
| 2009/0076912 | A1 * | 3/2009 | Rajan et al. | 705/14 |
| 2009/0287574 | A1 * | 11/2009 | Kane | 705/14.73 |
| 2010/0036731 | A1 * | 2/2010 | Vieri | 705/14.53 |
| 2010/0036734 | A1 * | 2/2010 | Pan | 705/14.55 |
| 2010/0057545 | A1 * | 3/2010 | Jean et al. | 705/14.4 |
| 2010/0058383 | A1 * | 3/2010 | Chang et al. | 725/35 |
| 2010/0145784 | A1 * | 6/2010 | Sriver et al. | 705/14.25 |
| 2011/0218858 | A1 * | 9/2011 | Christensen | 705/14.51 |
| 2011/0251879 | A1 * | 10/2011 | Lambert et al. | 705/14.13 |
| 2011/0302025 | A1 * | 12/2011 | Hsiao et al. | 705/14.42 |

(Continued)

*Primary Examiner* — Matthew T Sittner

(74) *Attorney, Agent, or Firm* — Hickman Palermo Becker Bingham LLP

(57) ABSTRACT

Mobile device advertising chains are described herein. Presenting a primary offer, comprising a first action, is caused on a mobile computing device. The first action is caused on the mobile computing device. An end of the first action is detected. Presenting a purchase offer, comprising a purchase action, is caused on the mobile computing device after the end of the first action. Data indicating that the purchase action was completed in connection with the mobile computing device based on the purchase offer is received. A sum of the value to confer in connection with the device for accepting both the primary offer and the purchase offer is determined. The sum of the values may be used in optimizing subsequent presentations of the primary offer to other mobile devices.

18 Claims, 5 Drawing Sheets

(56) References Cited

U.S. PATENT DOCUMENTS

| | | | |
|---|---|---|---|
| 2012/0150653 A1* | 6/2012 | Bennett et al. | 705/14.58 |
| 2012/0166267 A1* | 6/2012 | Beatty et al. | 705/14.21 |
| 2012/0209696 A1* | 8/2012 | Winner et al. | 705/14.45 |
| 2012/0221387 A1* | 8/2012 | Liu et al. | 705/14.16 |

* cited by examiner

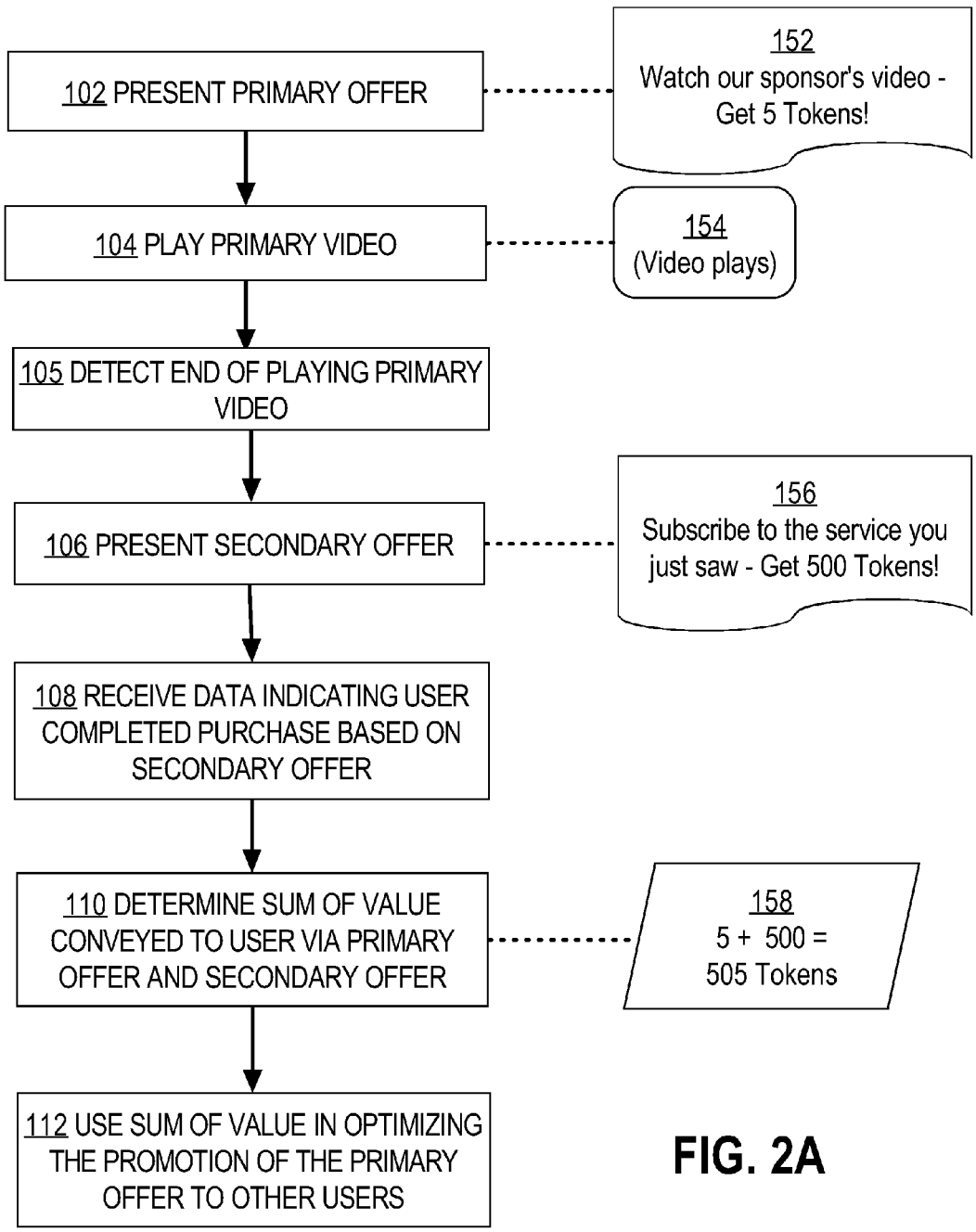

MOBILE DEVICE ADVERTISING CHAINS

CROSS-REFERENCE TO RELATED APPLICATIONS; BENEFIT CLAIM

This application claims the benefit of application 61/664,321, filed Jun. 26, 2012, the entire contents of which is hereby incorporated by reference as if fully set forth herein, under 35 U.S.C. §119(e).

FIELD OF THE DISCLOSURE

The present disclosure generally relates to displaying advertisements, user interface configurations, and related data processing methods for mobile computing devices. The disclosure relates more generally to techniques for presenting multiple related advertising offers on smartphones, tablet computers, and other computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Smartphones, such as the APPLE IPHONE device and ANDROID-based devices, support numerous applications or "apps" and mobile web sites, (collectively, "apps"), including those that present advertisements. In some cases, the advertisements consist of short videos that may be offered to a device user as a condition for obtaining a virtual reward, for example, the sort useful in a game or other app.

SUMMARY

The appended claims may serve as a summary of the invention.

BRIEF DESCRIPTION OF THE DRAWINGS

In the drawings:

FIG. 2A, FIG. 2B illustrate example processes of chaining offers and advertisements, and using the results in optimization of presentation of advertisements.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

Figure 1:
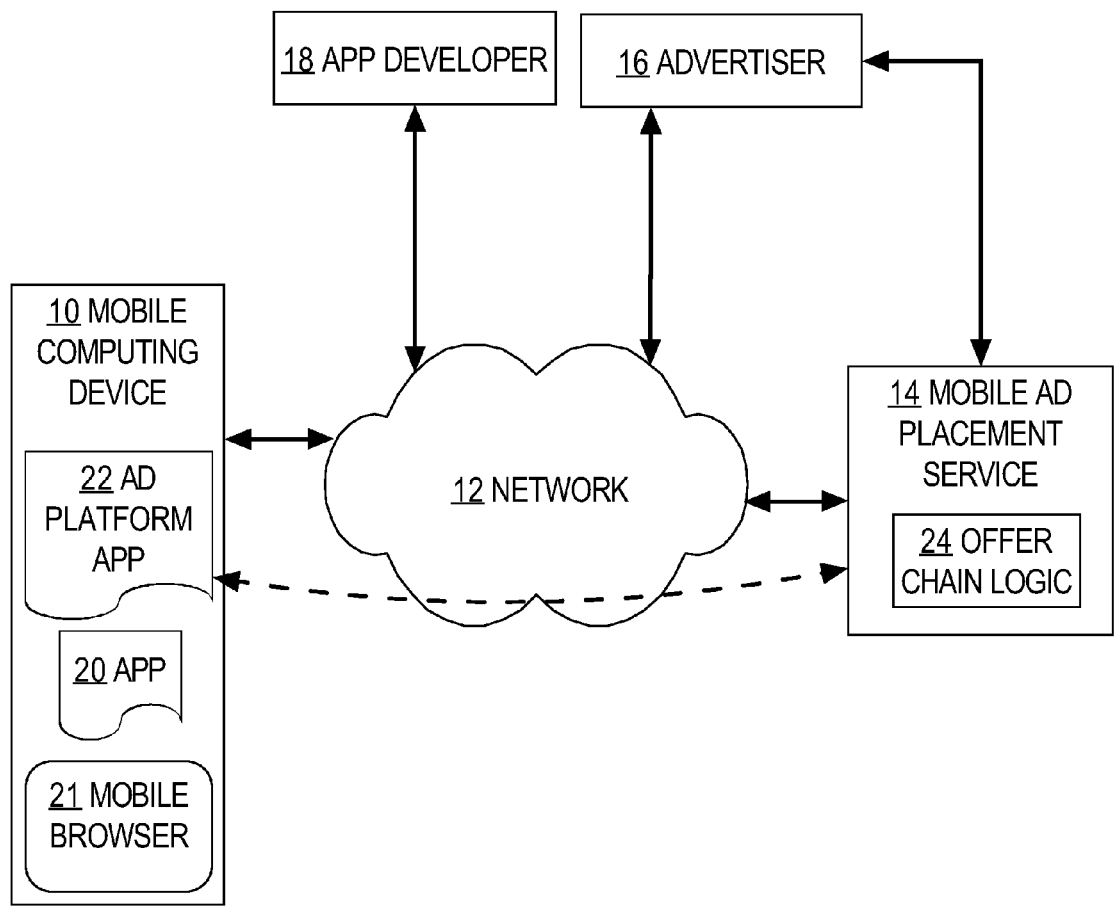
FIG. 1 illustrates a computer network context in which embodiments may be implemented.

FIG. 1 illustrates a computer network context in which embodiments may be implemented.

In an embodiment, a mobile computing device 10 hosting one or more apps 20, a mobile Web browser 21 and an advertisement platform app 22 is communicatively coupled to one or more networks 12. Network(s) 12 represent one or more local area networks, wide area networks, internetworks, or combinations such as the global internetworks known as the Internet.

In an embodiment, device 10 typically comprises a smartphone such as an IPHONE device, ANDROID-based device, tablet computer, or other mobile computing device. The device 10 may have, but is not required to have, a cellular radiotelephone transceiver and voice call capability. App 20 may comprise any computer program application that is executable on device 10 to perform a function that is useful to the user. Mobile browser 21 may comprise any computer program application that is executable on device 10 to request, parse and display documents, pages and online applications using HTML and HTTP over cellular or wireless network connections and facilitate browsing internet sites. In an embodiment, app 20 is a game app, but other embodiments may be used with apps that are not games. In an embodiment, the advertisement platform app 22 is a special-purpose advertising unit that enables the user of device 10 to display actionable advertisements, and facilitates the display and interaction with advertisements on the mobile computing device or within the app 20 or browser 21, in the manner that is further described herein.

In an embodiment, an app developer 18 or computers associated with an app developer is communicatively coupled to network(s) 12. App developer 18 typically develops, offers, and supports one or more apps and makes the apps available for download and installation into mobile computing device 10 through an only marketplace or store or for access via a mobile browser such as browser 21. For example, app developer 18 may be the author or offeror of app 20.

In an embodiment, an advertiser 16 or computers associated with an advertiser is communicatively coupled to network(s) 12. The advertiser 16 is configured to serve advertisements through network(s) 12 to the device 10 directly or indirectly through the advertisement platform app 22. For example, the advertisement platform app 22 may integrate with app 20 and/or browser 21 to cause the app to request and display advertisements from advertiser 16 as part of game pay or another function of the app. Alternatively the app 20 may be configured to directly request and display advertisements from advertiser 16. Requests and displays typically are accomplished using open standard internet protocols such as HTTP to reference files containing advertisements that are stored at advertiser 16 or at the mobile advertisement placement service 14, which may act as an agent or proxy for the advertiser in delivering advertisements to device 10, app 20 or advertisement platform app 22. The advertiser 16 may be a merchant of goods or services that are depicted in the advertisements or may be an advertising agency that acts on behalf of merchants.

In an embodiment, mobile advertisement placement service 14 comprises computers that are configured to make the advertisement platform app 22 available to interested devices such as device 10 and to deliver and install the advertisement platform app on such devices. Once installed or accessed using browser 21, the advertisement platform app 22 is configured to integrate advertisements and rewards into other apps such as app 20 and/or browser 21. For example, the advertisement platform app 22 can be configured with software hooks into app 20 and/or browser 21 so that particular execution milestones within the app cause the advertisement platform app to cause displaying of advertisements on the device 10.

In an embodiment, mobile advertisement placement service 14 comprises offer chain logic 24, which comprises one or more computer programs or other software elements that are configured to perform the functions that are further described herein. In one embodiment, offer chain logic 24 generally implements a process of rewarded video views with rewarded secondary actions that are displayed to consumers after viewing such videos. In general, the process comprises causing displays of one or more videos that comprise interactive video advertisements, tied to one or more secondary action formats, and then optimization of subsequent placements of the first video advertisement based on the combined value of the strings of multiple customer conversions that may result from displaying a plurality of successive video advertisements and secondary and/or tertiary actions. In an embodiment, offer chain logic 24 comprises program(s) that implement the logic of FIG. 2A.

2. Presenting Primary and Secondary Offers

FIG. 2A illustrates an example process of chaining offers and advertisements, and using the results in optimization of presentation of advertisements.

At block 102, a primary offer is presented. In an embodiment, block 102 involves causing display of an offer on the device 10 within the app 20 and/or browser 21 or advertisement placement app 22. For example, as illustrated in block 152, if the app 20 and/or browser 21 is a game app in which the user may use virtual rewards to obtain virtual goods or services or attain levels or other goals within the game, the primary offer might state, "Watch our sponsor's video—Get X Tokens!" In this example, "X" equates to the number of Game Rewards that equates to the value the advertiser is willing to pay for completion of the offer, including tokens, Game Rewards, real and/or virtual currency, or any other reward. Block 152 gives the example of 5 tokens. Virtual rewards do not necessarily have any actual monetary value or redemption value. The primary offer may involve virtual rewards and/or non-virtual rewards.

Primary offers may be presented in a variety of locations, such as banners in a graphical user interface that is presented in an app, or on a list of offers or "offer wall" which the user voluntarily reviews to earn virtual rewards for apps that the user is currently using. Advertisers 16 arrange for placement of advertisements on the offer wall, in this example.

At block 104, a primary video is played. Block 104 is reached in response to receiving input indicating that a user accepted the offer of block 102 and/or block 152, for example, by using input devices of the device 10 to click through or select a link indicating acceptance of the offer. In response, as shown by block 154, an advertisement video plays on the device 10.

At block 105, the end of playing the primary video is detected. Detecting the end of playback may occur through software functions of the advertisement placement app 22 and/or browser 21 on device 10 or by a signal from an advertisement server function within the mobile advertisement placement service 14.

At block 106, a secondary offer is presented. The secondary offer may be presented in response to detecting the end of playing the primary video. For example, if the video of block 154 promotes a subscription service such as a video rental service, online magazine or newspaper, or other content service, then as shown in block 156 the secondary offer may state, "Subscribe to the service you just saw—Get Y Tokens!" In this example, "Y" equates to the number of Game Rewards that equates to the value the advertiser is willing to pay for completion of the offer in tokens, Game Rewards, real and/or virtual currency, or any other reward. Block 156 gives the example of 500 tokens. An offer may relate to actions other than making content accessible to the user or device. A reward does not necessarily have any actual monetary value or redemption value. The secondary offer may involve virtual rewards and/or non-virtual rewards. Other examples of secondary offers include requests to apply for a credit card in exchange for virtual rewards, or requests to take a survey in exchange for virtual rewards.

Typically the virtual reward offered in the secondary offer will be higher than the reward given for the primary offer, because the secondary offer relates to conversion of the user of device 10 for the advertiser 16 or a related party. However, in an alternate embodiment, the virtually reward offered in the secondary offer is less than or equal to the virtual reward offered in the primary offer.

At block 108, the process receives data indicating that a user of the device completed a conversion that was based on the secondary offer. For example, assume that the user of device 10 accepts the secondary offer by clicking through the advertisement of block 156, completes a order form related to an offer, and completes an offer. Using means or mechanisms that have been used and applied in other contexts, a merchant initiating the offer or the advertiser 16 provides a signal to the mobile advertisement placement service 14 indicating that a transaction was completed. The merchant and advertiser provide such a signal in part to fulfill contractual obligations to pay a fee to the mobile advertisement placement service 14 for directing the customer to the merchant or advertiser.

At block 110, the process determines a sum of the value conferred on the user or mobile device for accepting both the primary offer and the secondary offer. In the example of FIG. 2A, as shown in block 158, the sum is 5 Tokens+505 Tokens=505 Tokens. The sum of the value conferred may be virtual, non-virtual, or a combination thereof.

In block 112, the process uses the sum of the values in optimizing subsequent presentations of the primary offer to other users. As an example, assume that a user of the mobile device watches a video promoting a monthly flower delivery service in exchange for X Amount of virtual rewards and then subscribes to the monthly flower delivery service and is rewarded with Y Amount of virtual rewards via a secondary offer. In the present approach, the original video advertisement is worth $15.10 in conversion value. The present approach is based on the insight that conversions of the secondary offer would not have occurred but for presentation of the primary offer, and the primary offer served as the initial driver for the subsequent conversions; therefore, the primary video offer should be prioritized, for purposes of presentation to future viewers, based on the total end to end value that the primary video offer created.

In this context, "prioritization" or "optimization" of the primary video offer refers to determining whether the primary video offer should be displayed to a particular mobile device in comparison to other offers—typically of other advertisers—that the mobile advertisement placement service 14 manages based on an expected value model. That is, among a plurality of advertisers all of whom want their advertisements displayed to the mobile device 10, the particular advertiser 16 who has the highest expected value when factoring both bid rate and conversion rate is entitled to have the mobile advertisement placement service 14 deliver its advertisement to the mobile device. Further, bids of the particular advertiser 16 for a particular advertisement may be weighted based upon the total value that the advertiser has realized from prior presentations of the same advertisement.

Moreover, the mobile advertisement placement service 14 may elect to present a particular advertisement more often, or less often, based on total value yielded from prior presentations of the advertisement, because successful advertisements ultimately yield more commission-type value to the mobile advertisement placement service.

3. Presenting Primary and Subsequent Offers

Figure 2B:
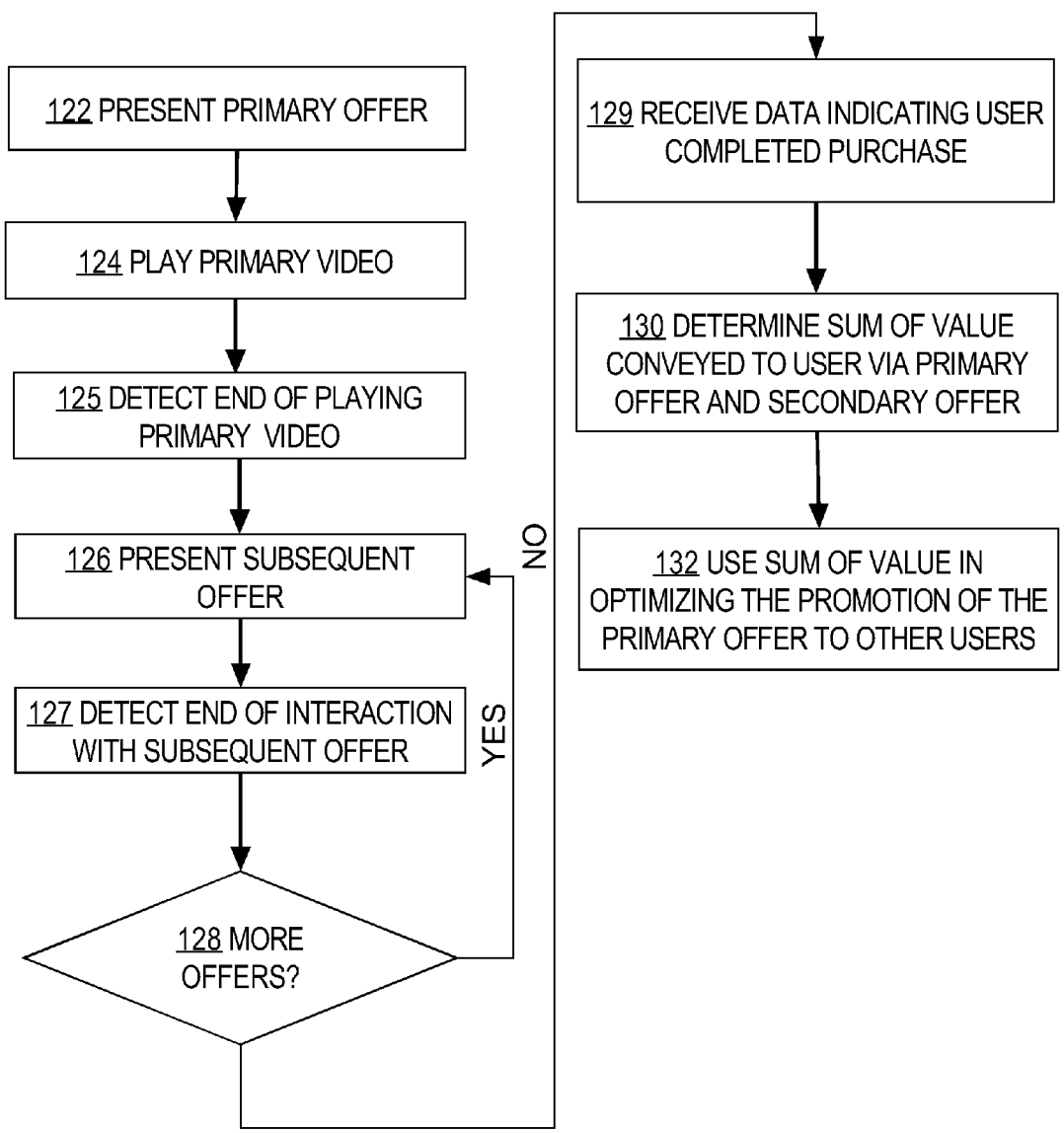

FIG. 2B illustrates an example process of chaining offers and advertisements, and using the results in optimization of presentation of advertisements.

At block 122, a primary offer is presented. In an embodiment, block 122 involves causing display of an offer on the device 10 within the app 20 and/or browser 21 or advertisement placement app 22. Virtual rewards do not necessarily have any actual monetary value or redemption value. The primary offer may involve virtual rewards and/or non-virtual rewards. Primary offers may be presented in a variety of locations, such as banners in a graphical user interface that is presented in an app, or on a list of offers or "offer wall" which the user voluntarily reviews to earn virtual rewards for apps that the user is currently using. Advertisers 16 arrange for placement of advertisements on the offer wall, in this example.

At block 124, a primary video is played. Block 124 is reached in response to receiving input indicating that a user accepted the offer of block 122, for example, by using input devices of the device 10 to click through or select a link indicating acceptance of the offer.

At block 125, the end of playing the primary video is detected. Detecting the end of playback may occur through software functions of the advertisement placement app 22 and/or browser 21 on device 10 or by a signal from an advertisement server function within the mobile advertisement placement service 14.

At block 126, a subsequent offer is presented. The subsequent offer may be presented in response to detecting the end of playing the primary video. An offer may relate to actions other than making content accessible to the user or device. A reward does not necessarily have any actual monetary value or redemption value. The subsequent offer may involve virtual rewards and/or non-virtual rewards. Other examples of subsequent offers include requests to apply for a credit card in exchange for virtual rewards, or requests to take a survey in exchange for virtual rewards.

Typically the virtual reward offered in the subsequent offer will be higher than the reward given for the primary offer, because the subsequent offer relates to conversion of the user of device 10 for the advertiser 16 or a related party. However, in an alternate embodiment, the virtually reward offered in the subsequent offer is less than or equal to the virtual reward offered in the primary offer.

At block 127, the end of playing the primary video is detected. Detecting the end of playback may occur through software functions of the advertisement placement app 22 and/or browser 21 on device 10 or by a signal from an advertisement server function within the mobile advertisement placement service 14.

At decision block 128, it is determined whether to present more subsequent offers. Any number of offers may be chained together resulting in combined optimizations for the primary offer. For example, the mobile advertisement placement service 14 may be configured to detect the end of user interaction with a secondary offer and to respond by causing presentation of a tertiary offer. For example, the primary offer could be to watch a video commercial for a credit card in exchange for a first reward; the next subsequent offer might involve taking a survey about the user's reaction to the credit card brand shown in the video commercial, in exchange for a second reward; and the next subsequent offer could be to sign up for a particular credit card in exchange for a third reward.

At block 129, the process receives data indicating that a user of the device completed a conversion that was based on the secondary offer or any other subsequent offer. Using means or mechanisms that have been used and applied in other contexts, a merchant initiating the offer or the advertiser 16 provides a signal to the mobile advertisement placement service 14 indicating that a transaction was completed. The merchant and advertiser provide such a signal in part to fulfill contractual obligations to pay a fee to the mobile advertisement placement service 14 for directing the customer to the merchant or advertiser.

At block 130, the process determines a sum of the value conferred on the user or mobile device for accepting the primary offer and the subsequent offer/s. The sum of the value conferred may be virtual, non-virtual, or a combination thereof.

In block 132, the process uses the sum of the values in optimizing subsequent presentations of the primary offer to other users.

4. Surveys as a Primary Offer

While certain examples discussed above have focused on video advertisements as the primary offer, any form of promotion may be used as the primary offer. For example, FIG. 3 illustrates using a survey, presented in the graphical user interface of the mobile device, as the primary offer.

Figure 3:
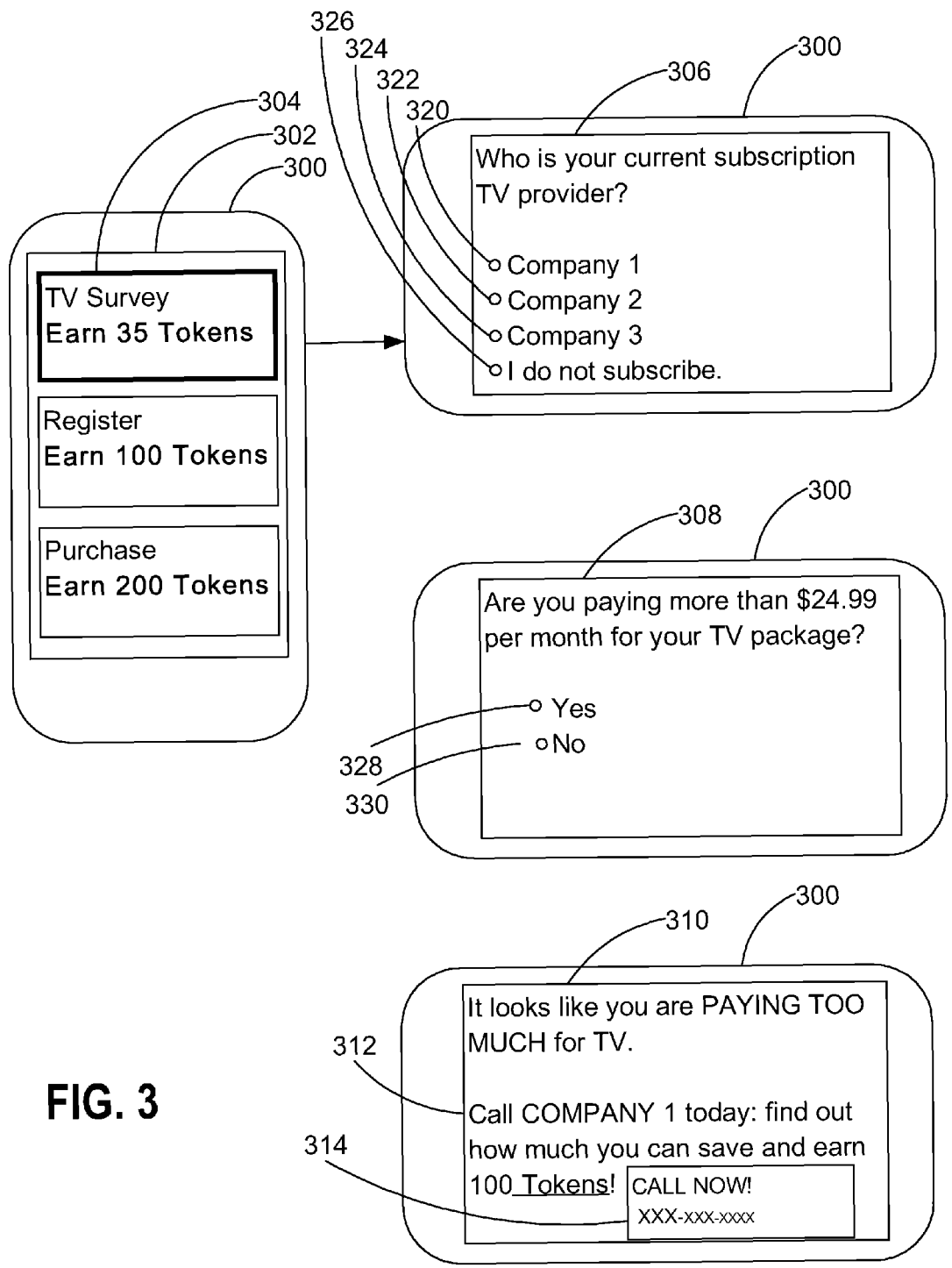
FIG. 3 illustrates using a survey, presented in the graphical user interface of the mobile device, as the primary offer.

In FIG. 3, a user interface 302 is displayed on device 300. In one embodiment, device 300 is a mobile device. User interface 302 allows selection of primary offer 304, which may be presented in a list or offer wall of a plurality of offers in user interface 302. As shown, primary offer 304 states "TV Survey: Earn 35 Tokens." The 35 Tokens used in this example is a representation of virtual rewards that may be available to consumers in a given app. Thus, the primary offer provides a virtual reward to the user to take a survey.

If the user voluntarily accepts primary offer 304, then user interface 306 is displayed on device 300. User interface 306 displays a first survey question. In one embodiment, the mobile advertisement placement service 14 sends data for one or more sets of survey questions to the mobile device 10. In one embodiment, one or more survey questions is answered choosing an answer from responses 320-326. Depending on the answers to the questions, the user may be presented with a secondary offer, such as the secondary offer shown in user interface 310.

For example, in some embodiments, the survey questions cause the user to identify, in responses 320-326, a sponsor of the offers or competitors of the sponsor. In example user interface 306, responses 320-326 are provided. "Company 1" is a sponsor of the offers, while "Company 2" and "Company 3" are competitors. Depending on the goal of the sponsor and the selected answer from responses 320-326, a secondary offer may be presented, one or more additional survey questions may be asked, or the survey may terminate.

In one embodiment, the sponsor's goal is to gain subscribers from a competitor. When response 320 is selected indicating that the sponsor is favorably selected, there may be no need to present a secondary offer. If the sponsor is not selected, then secondary offer 312 is presented in user interface 310. In one embodiment, the secondary offer presented in user interface 310 is selected from multiple secondary offers based on the answer selected from responses 320-326. For example, if the selected answer is response 326, stating "I currently do not subscribe," a secondary offer directed to non-subscribers may be selected.

Alternatively or additionally, one or more additional survey questions may be asked before the secondary offer is presented, such as the example additional survey question shown in user interface 308. User interface 308 displays an additional survey question. In one embodiment, responses 328-330 to one or more additional survey questions are used to tailor secondary offer 312. In example user interface 308, an additional survey question is asked to determine pricing information regarding services obtained by a potential customer from a competitor, such as Company 2 and/or Company 3. Depending on the goal of the sponsor and the selected answer from responses 328-330, the secondary offer may be presented, one or more additional survey questions may be asked, or the survey may terminate. For example, if the user identifies a high TV bill from a competitor, secondary offer 312 may be presented in user interface 310. In one embodiment, the secondary offer presented in user interface 310 is selected from multiple secondary offers based on the answer selected from responses 320-326 and/or responses 328-330.

The survey may include one or more follow-up questions before secondary offer 312 is presented. Secondary offer 312 provides a secondary incentive, such as "Call COMPANY 1 today: to find out how much we can save you on your monthly TV bill and earn 100 Tokens." Similarly, the 100 Tokens used in this example is a representation of virtual rewards that may be available to consumers in a given app. In one embodiment, the user interface 310 includes one or more elements 314 configured to facilitate the action required to accept the secondary offer.

In the example of FIG. 3, incentives are expressed in terms of virtual rewards: 35 Tokens for accepting the primary offer and 100 Tokens for accepting the secondary offer. In an embodiment, each virtual reward used as an incentive has a conversion rate to a real currency such as dollars. For example, 35 Tokens might correspond to an advertiser's bid of $0.35. The example of FIG. 3 may be integrated with the approach of FIGS. 2A-2B by using the sum of the virtual rewards and the corresponding payment amounts associated with the offers in optimizing future placements of the first offer. Thus, if the user calls the phone number stated in the secondary offer and completes a desired outcome such as subscribing to a TV service, then the sum of the virtual rewards and the corresponding payment amounts associated with the sequential offers ((35 Tokens=$0.35)+(100 Tokens=$1))=$1.35 would be used for purposes of determining the value of the primary offer and optimizing whether to present the primary offer to the same user or other users in the future.

Thus, in an embodiment the process herein provides the capability of leveraging a first advertisement into another advertisement (and potentially a third advertisement or any number of subsequent advertisements) and then optimizing the promotion of the original advertisement based upon the conversion value of the string of conversions. A virtually rewarded pay-for-performance model is used to provide secondary calls to action. Consequently, the impact of the revenue yielded from conversion of a secondary offer is appropriately associated with the primary offer and used in optimization of placement of the primary offer.

In addition, the approach herein provides the clear benefit of improving consumer knowledge and familiarity about a brand so that conversion rates for the secondary offer are likely to be higher as a result of the consumer's exposure to the primary offer. Rather than merely responding to an icon and reward amount associated with a single offer, users are given context about what a brand represents and what value the consumer can expect from the brand through a video, for example, presented as the primary offer; therefore, conversion of the secondary or tertiary offers should be higher. Still another benefit is that an advertiser can potentially bid less for the primary offer yet still get the same conversion rate, measured from the secondary offer, as the advertiser would have realized with a higher bid for a single offer. In some cases the advertiser may ultimately pay for a much larger number of views of the primary offer that do not result in conversion of the secondary offer, but the cost of each such view may be lower.

The approaches herein also offer the benefit of integrating surveys as secondary offers with a video-oriented primary offer, which enables advertisers to request more information voluntarily from the end user. Thus, if the secondary offer is a survey, the advertiser 16 or mobile advertisement placement service 14 can obtain more information about brand affinity or the propensity of a user to complete a certain transaction and then use that data to price the next transaction.

For example, assume that a subscription service brand will pay mobile advertisement placement service 14 $X for any new subscriber. If the mobile advertisement placement service 14 can predict, from survey-obtained data, that a first user will leave the subscription service in three (3) months but a second user is an enthusiast for the brand who just abandoned a competing brand and thus is likely to be a 5-year subscriber, then the brand might bid higher or lower for presentation of advertisements to the first user as compared to the second user. In an embodiment, the bid amounts for each type of user prediction may be pre-configured at mobile advertisement placement service 14, and a database of offers at the mobile advertisement placement service 14 may be configured with multiple offers that may be selected and presented as secondary or tertiary offers based on the results of the survey given as a primary or secondary offer. In an embodiment, mobile advertisement placement service 14 may be configured to present different wording in the tertiary offer based on the survey results.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
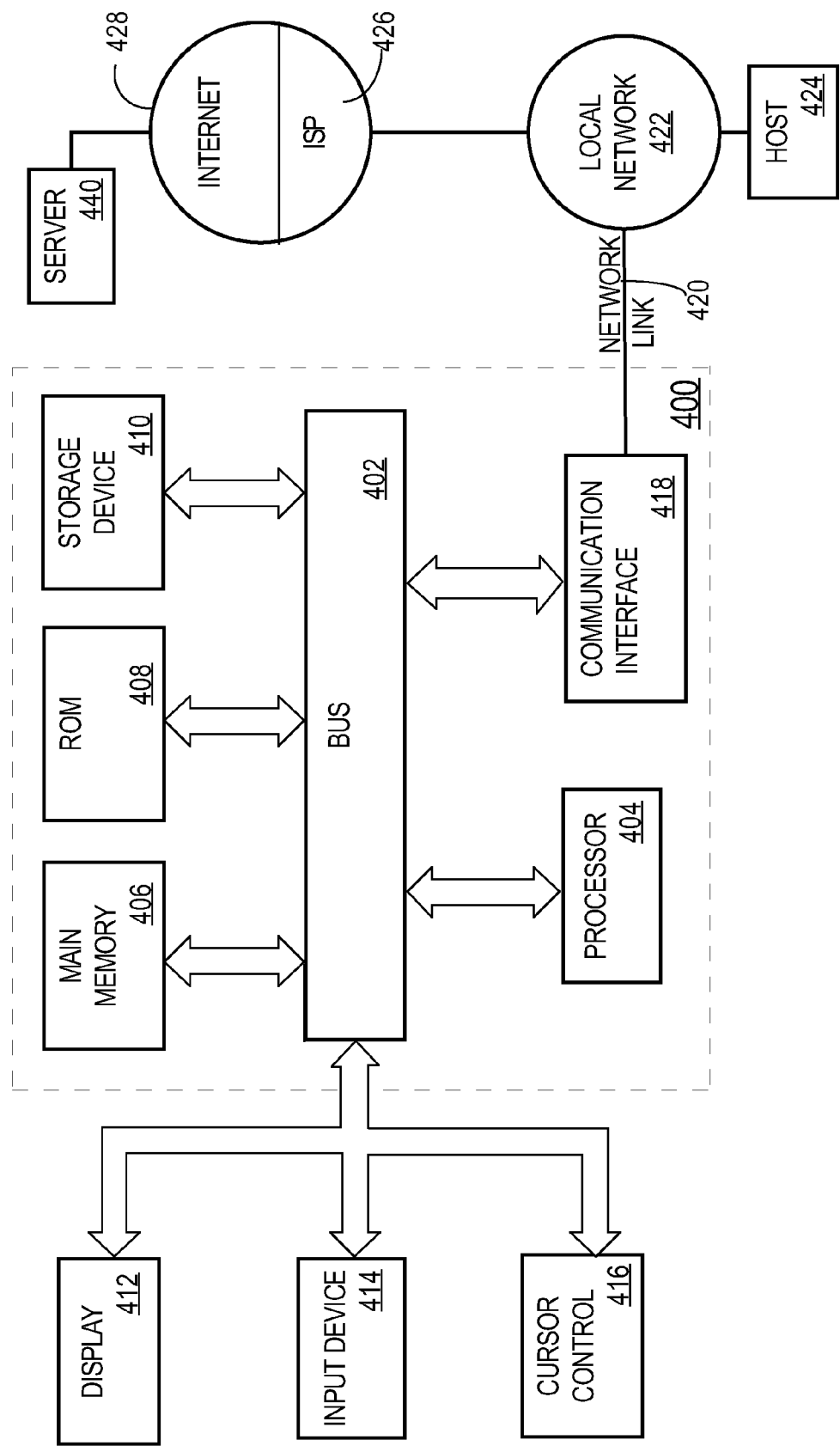
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
causing presenting, by a computer using an offer chain logic, a primary offer in a graphical user interface of a mobile computing device;
causing playing, by the computer using the offer chain logic, a primary video or other offer in response to an acceptance of the primary offer;
detecting, by an app, an end of playing the primary video or acceptance of another offer;
causing presenting, by the computer using the offer chain logic, a secondary offer, comprising a call to action, at the mobile computing device;
receiving data, from the app, indicating that a conversion was completed in connection with the device that was based on the secondary offer;
determining, by the computer using the offer chain logic, a sum of the value conferred in connection with the device for accepting both the primary offer and the secondary offer, and potentially tertiary offers;
using the sum of the values in optimizing subsequent presentations of the primary offer to other users of mobile devices;
wherein the method is performed by one or more special-purpose computing devices.

2. A method comprising:
causing presenting, by a computer using an offer chain logic, a primary offer, comprising a first action, on a mobile computing device;
causing, by the computer using the offer chain logic, the first action on the mobile computing device;
detecting an end of the first action;
causing, by the computer using the offer chain logic, presenting a purchase offer, comprising a purchase action, on the mobile computing device after the end of the first action;
receiving, from an app, data indicating that the purchase action was completed in connection with the mobile computing device based on the purchase offer;
determining, by the computer using the offer chain logic, a sum of the value to confer in connection with the device for accepting both the primary offer and the purchase offer;
wherein the method is performed by one or more computing devices.

3. The method of claim 2, wherein the first action comprises displaying a video.

4. The method of claim 2, wherein the first action comprises carrying out a survey.

5. The method of claim 4, wherein the purchase offer is selected based on one or more survey responses received from the mobile computing device.

6. The method of claim 2, further comprising:
causing presenting, by the computer using the offer chain logic, a subsequent offer, comprising a subsequent action, on the mobile computing device after the end of the first action;
causing, by the computer using the offer chain logic, the subsequent action on the mobile computing device;
detecting, by the app, an end of the subsequent action;
wherein causing presenting the purchase offer on the mobile device is after the end of the subsequent action;
the method is performed by one or more special-purpose computing devices.

7. The method of claim 6, wherein the first action comprises displaying a video and the subsequent action comprises carrying out a survey.

8. The method of claim 2, further comprising using the sum of the values in optimizing subsequent presentations of the purchase offer to other mobile devices.

9. The method of claim 2, wherein the purchase offer comprises a subscription.

10. One or more non-transitory storage media storing one or more sequences of instructions which, when executed by one or more computing devices, cause:
presenting, by a computer using an offer chain logic, a primary offer, comprising a first action, on a mobile computing device;
causing, by the computer using the offer chain logic, the first action on the mobile computing device;
detecting, by an app, an end of the first action;
causing, by the computer using the offer chain logic, presenting a purchase offer, comprising a purchase action, on the mobile computing device after the end of the first action;
receiving, from the app, data indicating that the purchase action was completed in connection with the mobile computing device based on the purchase offer;
determining a sum of the value to confer in connection with the device for accepting both the primary offer and the purchase offer.

11. The storage media of claim 10, further comprising one or more sequences of instructions which when executed cause presenting a primary offer, comprising displaying a video, on a mobile computing device.

12. The storage media of claim 10, further comprising one or more sequences of instructions which when executed cause presenting a primary offer, comprising carrying out a survey, on a mobile computing device.

13. The storage media of claim 10, further comprising one or more sequences of instructions which when executed cause selecting the purchase offer based on one or more survey responses received from the mobile computing device.

14. The storage media of claim 10, further comprising one or more sequences of instructions which when executed cause:
presenting, by the computer using the offer chain logic, a subsequent offer, comprising a subsequent action, on the mobile computing device after the end of the first action;
causing, by the computer using the offer chain logic, the subsequent action on the mobile computing device;
detecting, by the app, an end of the subsequent action;
wherein causing presenting the purchase offer on the mobile device is after the end of the subsequent action;
the method is performed by one or more special-purpose computing devices.

15. The storage media of claim 14, further comprising one or more sequences of instructions which when executed cause displaying a video as the first action and carrying out a survey as the subsequent action.

16. The storage media of claim 10, further comprising one or more sequences of instructions which when executed cause using the sum of the values in optimizing subsequent presentations of the purchase offer to other mobile devices.

17. The storage media of claim 10, further comprising one or more sequences of instructions which when executed cause using the sum of the values in optimizing subsequent presentations of the purchase offer to other mobile devices.

18. The storage media of claim 10, further comprising one or more sequences of instructions which when executed cause presenting a subscription, comprising a purchase action, on the mobile computing device after the end of the first action.

* * * * *